United States Patent

[11] 3,587,530

| [72] | Inventor | Weston L. Blair<br>501 Anderson, Weatherford, Tex. 76086 |
|---|---|---|
| [21] | Appl. No. | 814,391 |
| [22] | Filed | Apr. 8, 1969 |
| [45] | Patented | June 28, 1971 |

[54] ANIMAL FEEDER
1 Claim, 5 Drawing Figs.

[52] U.S. Cl. .................................................. 119/51.11, 119/56
[51] Int. Cl. .................................................. A01k 05/00
[50] Field of Search .................................................. 119/51.11, 56; 222/70

[56] References Cited
UNITED STATES PATENTS

| 779,434 | 1/1905 | Lyon | 119/51.14 |
| 1,085,459 | 1/1914 | Mendel | 119/51.15 |
| 3,101,159 | 8/1963 | Fletcher | 112/70 |
| 3,279,434 | 10/1966 | Evans | 119/56 |

Primary Examiner—Hugh R. Chamblee
Attorney—Herbert J. Brown

ABSTRACT: An animal feeder comprising a cylindrical hopper, a downwardly inclined spout having vertical sidewalls on the front of the hopper and having flat generally parallel top and bottom surfaces, an inclined surface in the hopper substantially in line with the bottom of the spout, a door in the spout and hingedly mounted in the upper rear portion thereof, and a solenoid on the spout operating the door.

PATENTED JUN28 1971
3,587,530
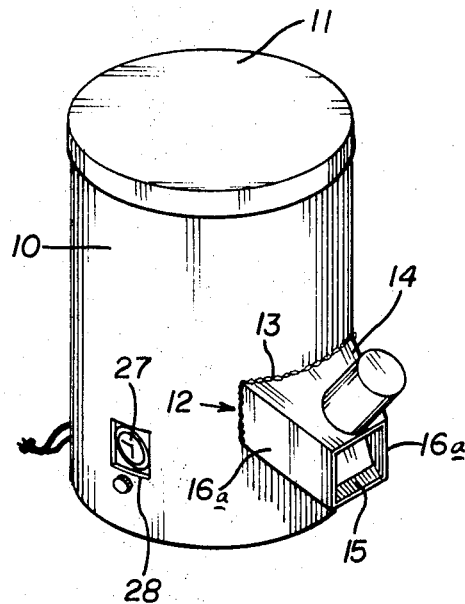
FIG. 1
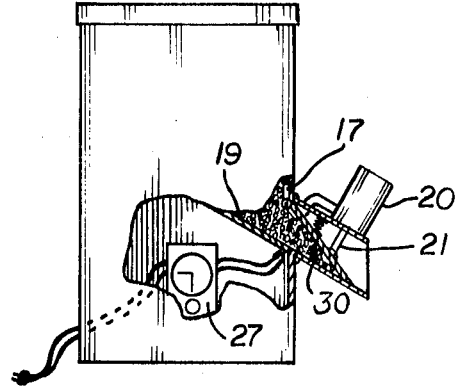
FIG. 3
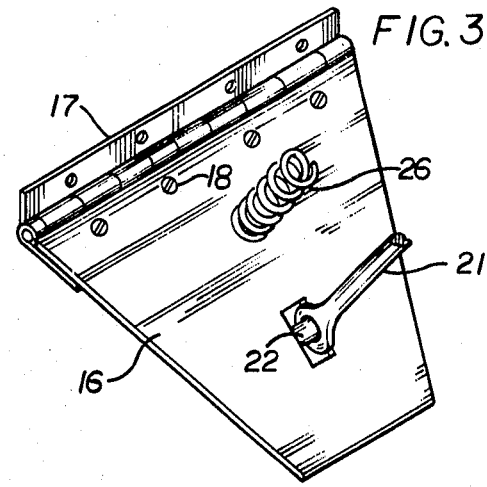
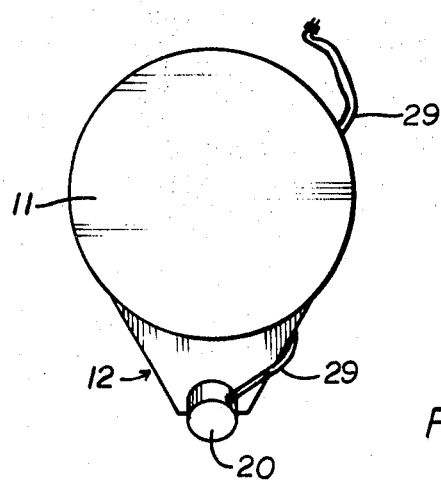
FIG. 2
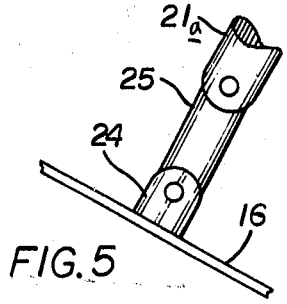
FIG. 5
FIG. 4
WESTON L. BLAIR
INVENTOR
BY Herbert J. Brown
ATTORNEY

ANIMAL FEEDER

This invention relates to animal feeders and has reference to that type of feeder which dispenses its contents automatically at selected intervals.

The primary object is to provide an automatic animal feeder which is economical in its construction, yet one which is efficient in its operation.

Another object is to provide a gravity flow feeder for dispensing pellets or other dry forms of feed capable of flowing down an incline yet which flow may be stopped by a simple mechanism.

A further object is to provide a feeder of the described class wherein the feed and the operating elements are protected from the weather.

A further object of the invention is to provide an inclined spout so shaped that it is readily supplied by a cylindrical hopper across a wide area, yet the mouth of the spout is sufficiently narrow so as to prevent over feeding.

These and other objects of the invention will become apparent from the following description and the accompanying drawing, wherein:

FIG. 1 is a perspective view of an animal feeder according to the invention.

FIG. 2 is a top plan view of the feeder shown in FIG. 1.

FIG. 3 is a side elevational view, shown partly in broken section, and illustrating the inclined baffle in the hopper and the dispensing door in the spout.

FIG. 4 is an enlarged perspective view of the dispensing door, and

FIG. 5 is a broken side elevational view of a modified form of the invention showing an alternate means for connecting the solenoid armature with the door.

The form of the invention shown in the drawing includes an upright cylindrical hopper 10 having a removable cover 11 and a downwardly and outwardly projecting spout secured to the spout near its bottom as by welding 13. The hopper 10 is comprised of flat upper and lower surfaces 14 and 15 and vertical sidewalls 16a. As best shown in FIGS. 1 and 2, the upper and lower surfaces 14 and 15 of the spout 12 are arcuate where they fit the cylindrical hopper 10 and are tapered along their sides to provide a discharge opening smaller than the inlet.

Within the spout 12, and conforming with the upper and lower surfaces 14 and 15, there is a door 16 having a hinge 17 along its inner edge. The hinge 17 is attached to the door 16 and the inner surface of the hopper 10 by screws 18 as shown; however, to those versed in the art it will be obvious that the hinge 17 may be attached to the upper spout surface 14 instead of the hopper. As shown only in FIG. 3, there is an inclined baffle 19 across the inner diameter of the hopper 10, the angle of which is in line with the lower spout surface 15.

On the top spout surface 14 there is a perpendicularly disposed and cased solenoid 20, the armature 21 of which extends downwardly through the spout surface where it contacts the lower surface of the door 16 by means of a transverse rod 22. As shown in FIG. 4, the end of the armature 21 engaging the rod 22 operates in an elongate slot 23 to accommodate the hinge movement of the door 16. In the modified form of the invention shown in FIG. 5, the armature 21a is shorter and is hingedly connected with an ear 24 on the door 16 by a pivotally mounted link 25. A coiled compression spring 26 is mounted by suitable means, not shown, between the door 16 and the upper surface 14 os the spout 12.

The solenoid 20 is operated by a timer 27 in an opening 28 in the wall of the hopper 10 and which timer is connected with a cord supply line 29 extending into the hopper beneath the baffle 19 and outwardly to the solenoid.

In operation, the cover 11 is first removed and the hopper 10 is filled with dry particles of foodstuff 30 which, in some cases, may be grain. The door 16 is normally closed by reason of the action of the compression spring 26, but when the solenoid is actuated by the timer 27 the door 16 is raised and the feed 30 flows down and out of the spout 12. The door 16 is raised at intervals and for short periods of time. It may be that the door 16 cannot fully close because of the presence of feed in the spout 12, but the clamping action of the spring 26 and door 16 will hold the feed in place.

I claim:

1. An animal feeder consisting of a cylindrical hopper having a vertical axis, a downwardly and outwardly inclined spout on said hopper substantially near the bottom portion thereof, said spout being wider at its inner end than its outer end and having a lower surface and vertical sidewalls, a door within said spout and hingedly mounted adjacent the top of the spout and adjacent said hopper, a compression spring mounted to urge said door downwardly and means selectively raising the door against the action of said spring, said means being comprised of a solenoid mounted on said spout, the armature of said solenoid being connected with the door and arranged to open the same.